United States Patent
Martin (10) Patent No.: US 9,989,377 B2
(45) Date of Patent: Jun. 5, 2018

(54) METHOD AND SYSTEM FOR DISPLAYING INFORMATION

(75) Inventor: Scott Martin, Levy, SC (US)

(73) Assignee: Gulfstream Aerospace Corporation, Savannah, GA (US)

( * ) Notice: Subject to any disclaimer, the term of this patent is extended or adjusted under 35 U.S.C. 154(b) by 420 days.

(21) Appl. No.: 13/416,776

(22) Filed: Mar. 9, 2012

(65) Prior Publication Data

US 2013/0234867 A1    Sep. 12, 2013

(51) Int. Cl.
    *G01C 22/00*    (2006.01)
    *G01C 23/00*    (2006.01)

(52) U.S. Cl.
    CPC ................................ *G01C 23/005* (2013.01)

(58) Field of Classification Search
    CPC ..................................................... G01C 23/00
    USPC .......... 340/945, 973; 701/14, 120, 3; 725/77
    See application file for complete search history.

(56) References Cited

U.S. PATENT DOCUMENTS

| | | | |
|---|---|---|---|
| 6,542,796 B1 | 4/2003 | Gibbs et al. | |
| 6,707,475 B1 | 3/2004 | Snyder | |
| 7,206,674 B1 | 4/2007 | Statler et al. | |
| 7,353,091 B2 | 4/2008 | Servantie et al. | |
| 7,602,314 B2 | 10/2009 | Winkler | |
| 7,747,360 B2 | 6/2010 | Canu-Chiesa et al. | |
| 7,751,948 B2 * | 7/2010 | Boorman | G01C 23/00 244/75.1 |
| 8,248,274 B2 * | 8/2012 | Christophe | G01C 23/00 340/963 |
| 8,682,580 B2 * | 3/2014 | Clark et al. | 701/467 |
| 8,723,686 B1 * | 5/2014 | Murray | G08G 5/0039 340/901 |
| 2005/0007261 A1 * | 1/2005 | Berson et al. | 340/945 |
| 2005/0231390 A1 * | 10/2005 | Crane et al. | 340/945 |
| 2008/0094255 A1 * | 4/2008 | Bethel | 340/971 |
| 2009/0024260 A1 | 1/2009 | Deleris et al. | |
| 2009/0118998 A1 * | 5/2009 | Chau et al. | 701/120 |
| 2010/0305786 A1 * | 12/2010 | Boorman | 701/16 |
| 2011/0219409 A1 * | 9/2011 | Frisco et al. | 725/77 |
| 2011/0313597 A1 * | 12/2011 | Wilson et al. | 701/3 |
| 2012/0035849 A1 | 2/2012 | Clark et al. | |
| 2012/0098679 A1 * | 4/2012 | Bethel | 340/973 |
| 2012/0274484 A1 * | 11/2012 | Zimmer et al. | 340/945 |
| 2013/0158751 A1 * | 6/2013 | Cornell et al. | 701/14 |
| 2013/0158991 A1 * | 6/2013 | Dong | G08G 5/0013 704/235 |
| 2013/0234867 A1 * | 9/2013 | Martin | G01C 23/005 340/971 |
| 2014/0027565 A1 * | 1/2014 | Marvin | B64C 27/57 244/17.13 |

(Continued)

OTHER PUBLICATIONS

The International Bureau of WIPO, International Preliminary Report on Patentability for International Application No. PCT/US2013/028138, dated Sep. 18, 2014.

(Continued)

*Primary Examiner* — Julie Lieu
(74) *Attorney, Agent, or Firm* — LKGlobal | Lorenz & Kopf, LLP (57) ABSTRACT

A display system for an aircraft includes a controller in communication with a display. The controller receives a category associated with a phase of flight of the aircraft. Information related to operation of the aircraft and associated with the received category is displayed on the display.

14 Claims, 10 Drawing Sheets

(56) References Cited

U.S. PATENT DOCUMENTS

2014/0365040 A1* 12/2014 Srivastav ............ G08G 5/0021
701/3

OTHER PUBLICATIONS

Search Report and Written Opinion dated May 8, 2013 in PCT/US2013/028138.
European Patent Office, Extended European Search Report in European Patent Application No. 13757365.5-1557, dated Sep. 21, 2015.

* cited by examiner

METHOD AND SYSTEM FOR DISPLAYING INFORMATION

BACKGROUND OF THE INVENTION

1. Field of the Invention

The present invention is related generally to systems and methods for presenting information. Specifically, the invention is related to systems and methods for presenting information to operators of a vehicle, such as an aircraft.

2. Description of the Related Art

Vehicles, such as aircraft, have traditionally used a plurality of analog gauges to present vehicle information to the operator the vehicle, e.g., the pilot. However, with advances in digital communications, remote sensing, and computing power, modern aircraft are now being equipped with computerized displays for presenting a vast amount of information to the vehicle operator.

Unfortunately, the amount of information available to the vehicle operator is often overwhelming. Furthermore, the organization of this information is typically presented in a inconvenient manner. For example, an aircraft pilot may have to navigate through multiple hierarchical-style menus just to find a bit of data or information. Moreover, related information may be available only separate display images. Thus, the vehicle operator spends an inordinate amount of time and effort to find the desired information.

Accordingly, it is desirable to provide a display system and method that provides information to a user in a more straightforward manner. Furthermore, other desirable features and characteristics of the present invention will become apparent from the subsequent detailed description of the invention and the appended claims, taken in conjunction with the accompanying drawings and this background of the invention.

BRIEF SUMMARY

A method of presenting aircraft flight information includes receiving a category at a controller. Each category is associated with a phase of flight of an aircraft. The method further includes displaying information related to operation of the aircraft associated with the received category on a display in response to receiving the category.

A display system includes a controller configured to receive a category associated with a phase of flight of an aircraft. A display is in communication with the controller and configured to display information related to operation of the aircraft associated with one of the categories in response to receiving the category.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a method and system 20 for presenting aircraft flight information is shown and/or described herein. The method and system 20 are described in conjunction with an aircraft (not shown). However, use of the method and system may also be applicable to other vehicles and non-vehicle applications. The method may be performed utilizing the system 20 as described herein. However, other systems, devices, and/or hardware may be utilized to implement the method described herein.

Figure 1:
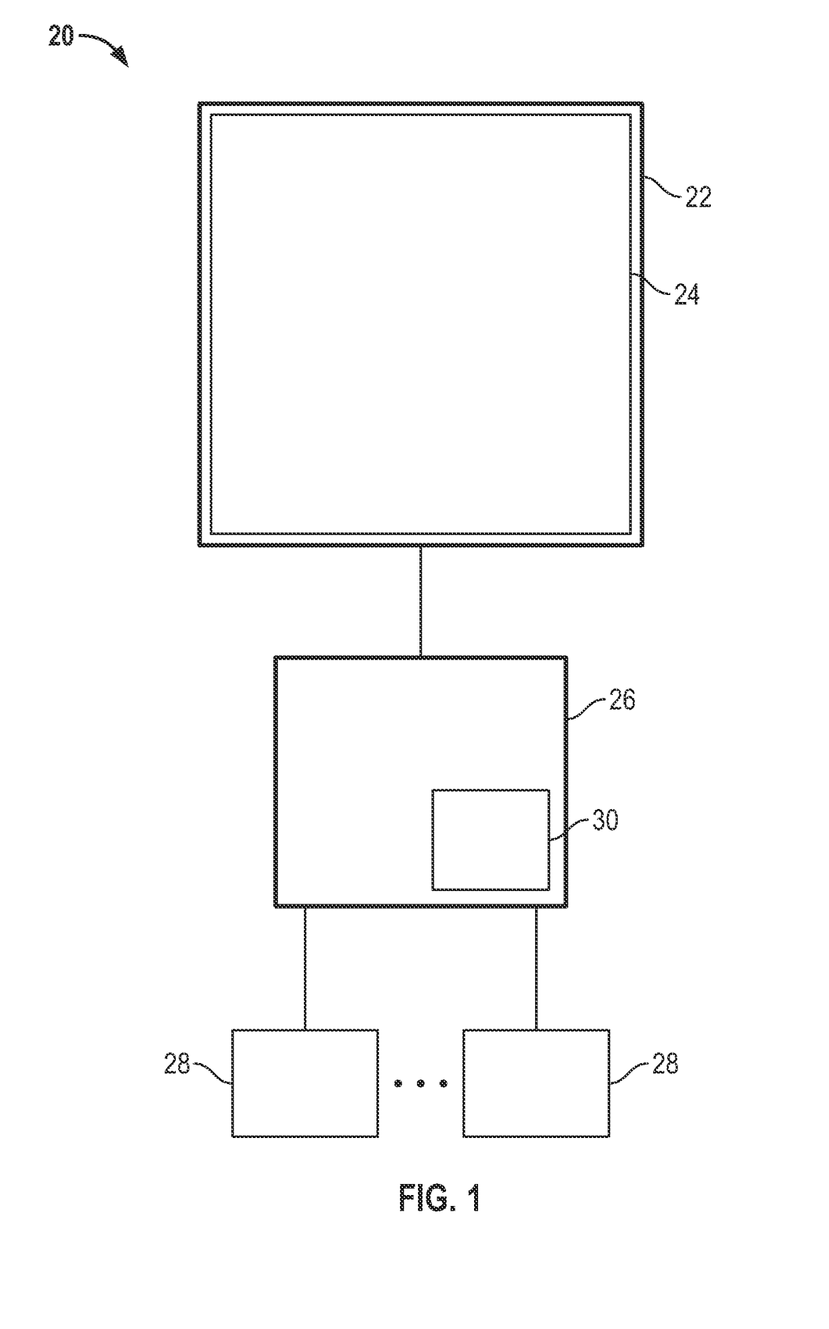
FIG. 1 is block diagram of a system for presenting aircraft flight information.
Figure 2:
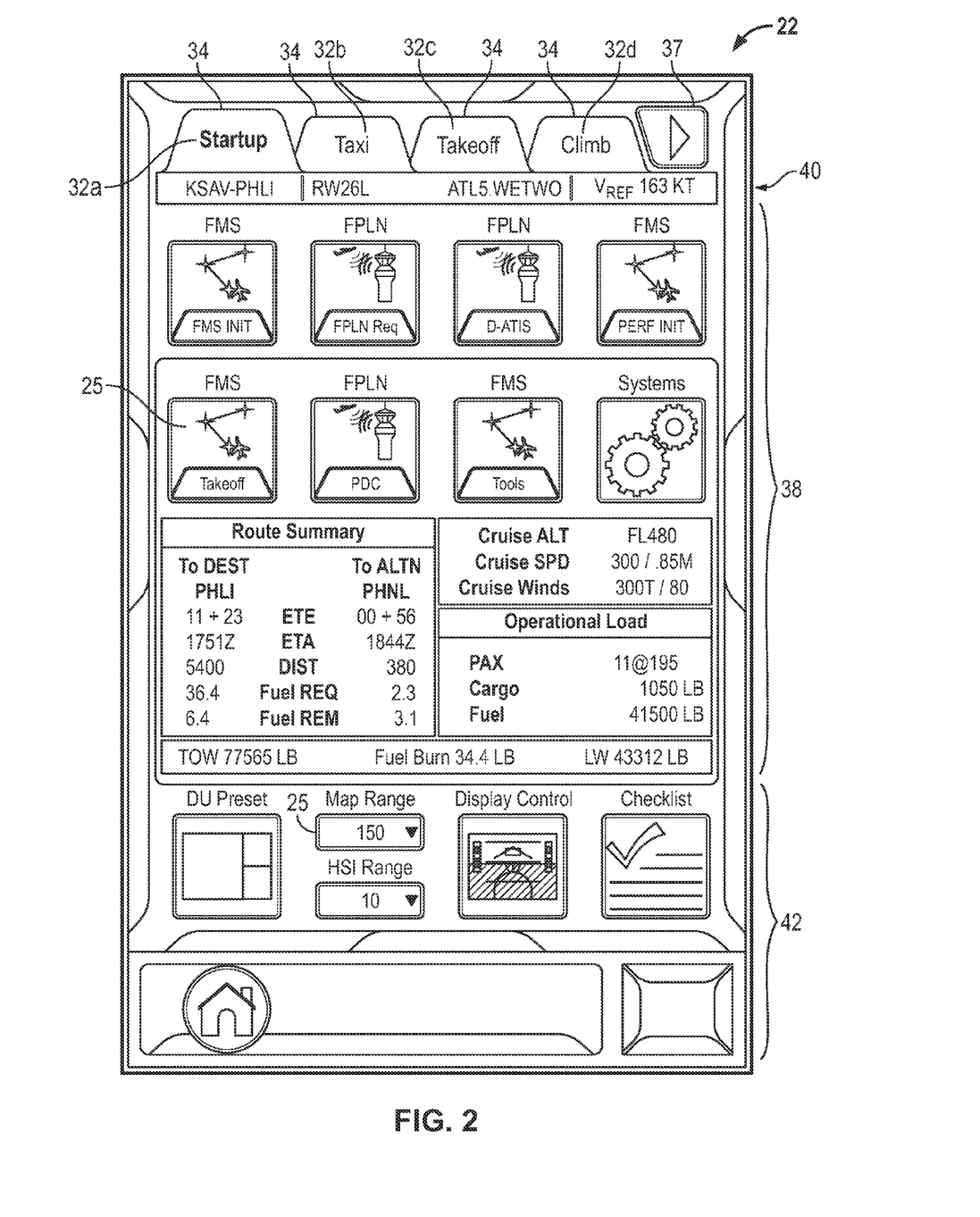
FIG. 2 is a display image associated with a start up phase of flight of an aircraft according to one embodiment.
Figure 3:
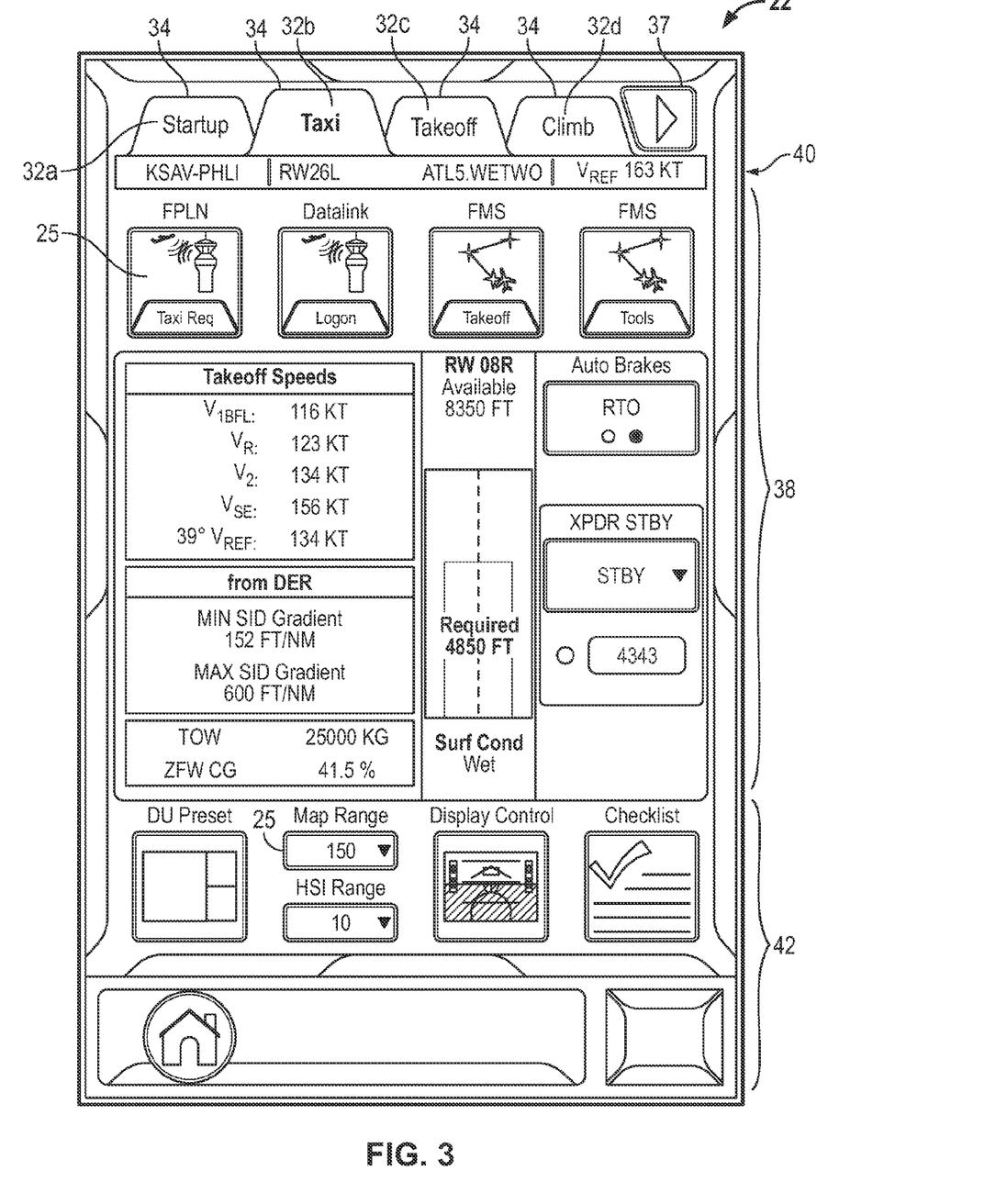
FIG. 3 is a display image associated with a taxi phase of flight of an aircraft according to one embodiment.
Figure 4:
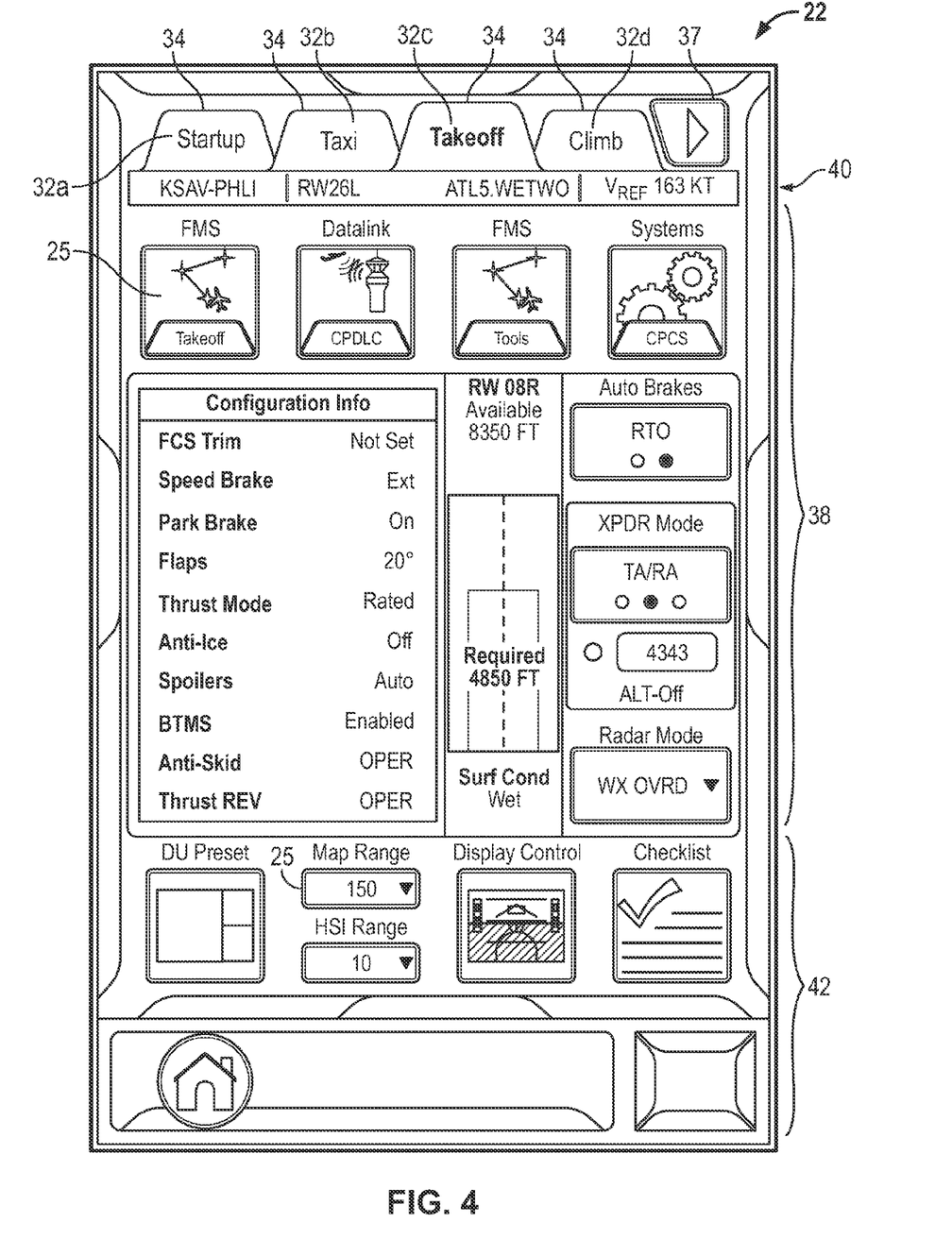
FIG. 4 is a display image associated with a takeoff phase of flight of an aircraft according to one embodiment.

In the illustrated embodiment, as shown in FIG. 1, the system 20 includes a display 22. The display 22 may be implemented with any suitable display technology, including, but not limited to, a liquid crystal display (LCD), a cathode ray tube (CRT), and a plasma screen. Referring to FIGS. 2-9, the display 22 displays a display image 23 to a user, such as a pilot of the aircraft, in any manner well known to those skilled in the art. The display image 23 conveys data and/or information through graphics and/or text, as is appreciated by those skilled in the art.

Referring again to FIG. 1, the system 20 also includes an input device 24 to allow the user to provide input, data, and/or other selections to the system 20. The display 22 of the illustrated embodiment is preferably a "touchscreen display". Accordingly, and as realized by those skilled in the art, the display 22 is integrated with the input device 24. As such, the input device 24 of the illustrated embodiment can detect the presence and location of a touch or gesture on the display 22. The input device 24 of the illustrated embodiment may employ any suitable touchscreen technology, including, but not limited to, capacitive, resistive, surface acoustic wave, infrared, and optical imaging. As such, as can be seen in FIGS. 2-9, the display 22 may present various selectors 25 to the user to receive input from the user. However, in alternative embodiments (not shown), the input device 24 may be separate from the display 22. For instance, a keyboard, mouse, or other pointer system may be implemented as the input device 24, as is recognized by those skilled in the art.

Referring again to FIG. 1, the system 20 may also include a controller 26 in communication with the display 22 and the input device 24. The communications between the controller 26 and the display 22 and/or the input device 24 may be accomplished with any of the numerous data communication techniques known to those skilled in the art. The controller 26 may receive the input from the input device 24. The controller 26 also receives data and information from at least one data source 28. This data and information may be conveyed to the display 22, such that this data and information may be displayed to the user. The data source 28 may be any of various sensors (not separately shown) monitoring operation of the aircraft. The data source 28 may also be a database (not separately shown), either on the aircraft or remote from the aircraft, storing information regarding operation of the aircraft. Of course, other implementations for the data source 28 are realized by those skilled in the art.

The controller 26 may be implemented as a microprocessor, application specific integrated circuit (ASIC), or other suitable device as realized by those skilled in the art. In one embodiment, the controller 26 may be integrated with the display. In another embodiment, the system 20 may include multiple controllers 26 in communication with one another. In yet another embodiment, the system may include a first controller 26 and a second controller 26 in communication with each other, where the first controller is integrated with the display 22 for providing the data to the display 22 and receiving input from the input device 24 while the second controller 26 is electrically connected to the at least one data source 28 for receiving information regarding the aircraft. Of course, other variations may be realized by those skilled in the art.

The system 20 also includes a memory 30, which in the illustrated embodiment, is in communication with the controller 26. The memory 30 stores data and/or information that is utilized by the controller 26 and/or the display 22. The memory 30 may be integrated with the controller 26 or as a separate device, as realized by those skilled in the art. The memory 30 may be referred to as a computerized memory 30.

Operation of the aircraft is performed in multiple phases or stages. These phases or stages are denoted herein as "phases of flight". Referring now to FIGS. 2-9, the phases of flight of the illustrated embodiment are labeled in the following categories 32: Start Up 32a, Taxi 32b, Takeoff 32c, Climb 32d, Cruise 32e, Descent 32f, Arrival/Landing 32g, and Thru Flight 32h. The Start Up category 32a is associated with initial start-up of the aircraft, e.g., prior to movement of the aircraft. The Taxi category 32b is associated with the movement of the aircraft towards a runway prior to takeoff of the aircraft. The Takeoff category 32c is associated with takeoff of the aircraft from the runway. The Climb category 32d is associated with a climb of the aircraft to a cruising altitude after takeoff form the runway. The Cruise category 32e is associated with a cruise stage of the aircraft. The Descent category 32f is associated with a descent of the aircraft after the cruise stage. The Arrival/Landing category 32g is associated with arrival and landing of the aircraft at an airport. The Thru Flight category 32h is associated with the conclusion of a flight. Of course, the phases of flight in other embodiments and implementations may have alternate categories 32 and/or additional categories 32. For example, the phases of flight may be labeled differently than in the illustrated embodiment. Furthermore, the system 20 and method may utilize less categories 32 than the ones illustrated herein.

Figure 5:
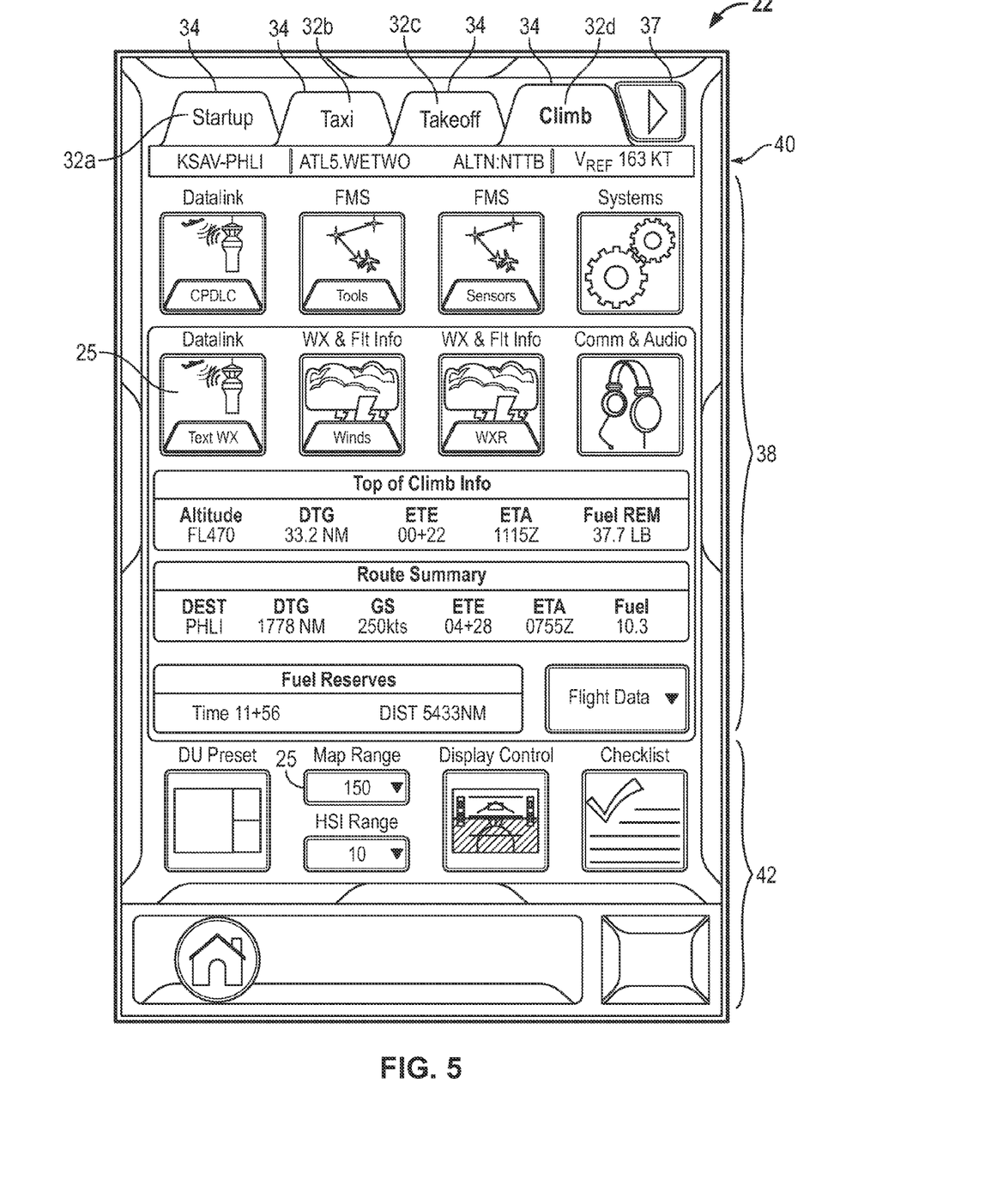
FIG. 5 is a display image associated with a climb phase of flight of an aircraft according to one embodiment.
Figure 6:
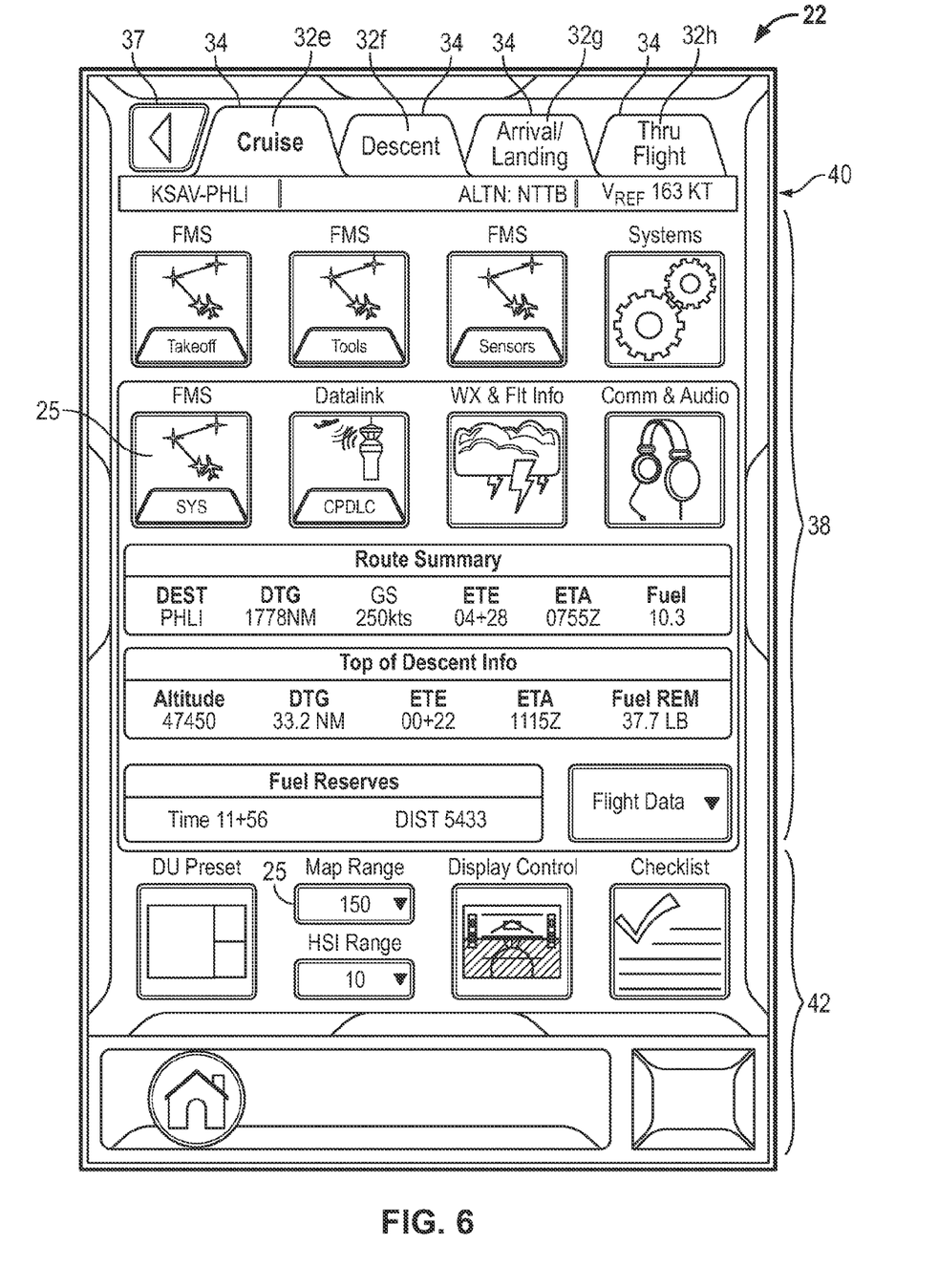
FIG. 6 is a display image associated with a cruise phase of flight of an aircraft according to one embodiment.
Figure 7:
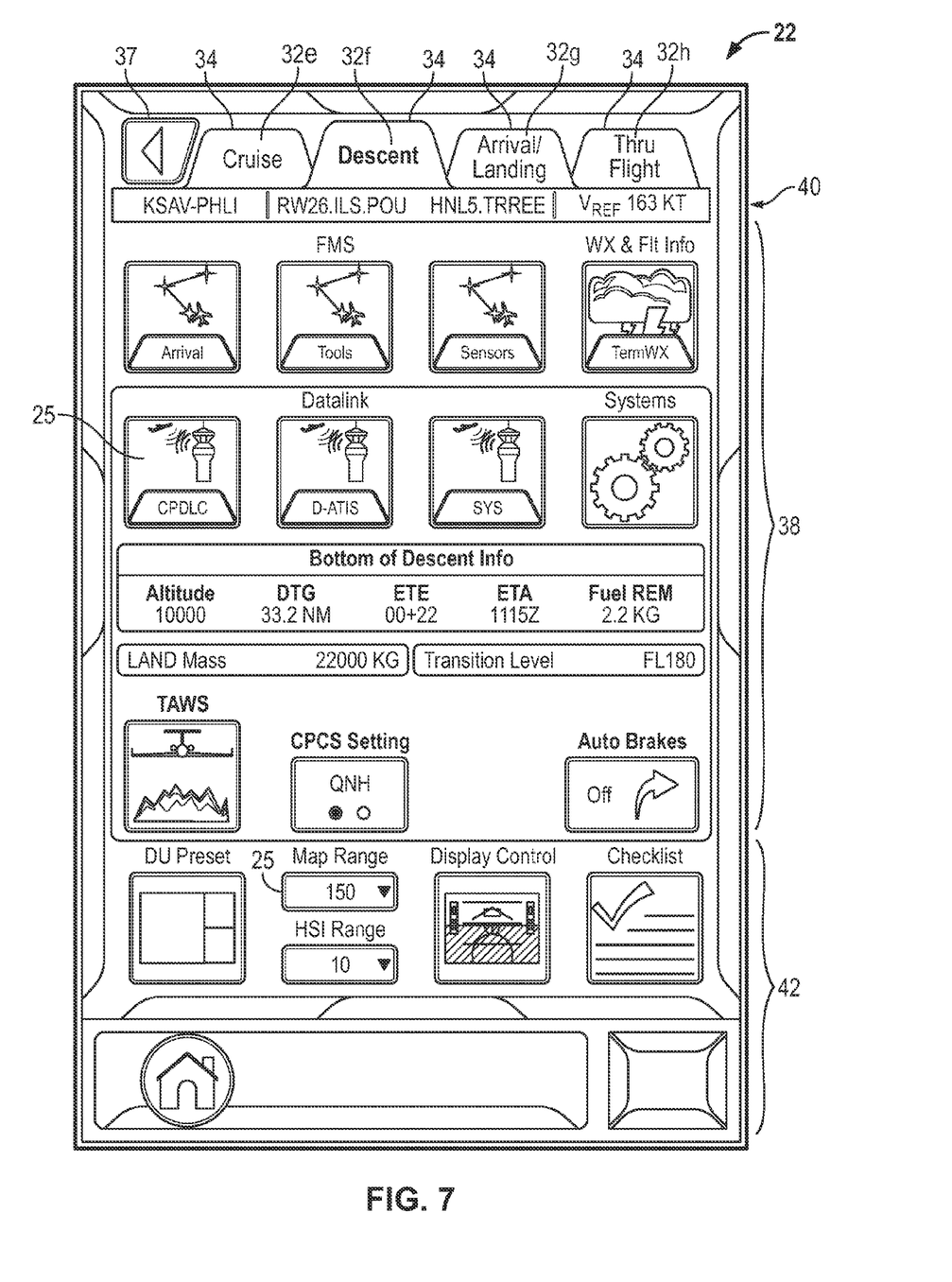
FIG. 7 is a display image associated with a descent phase of flight of an aircraft according to one embodiment.
Figure 8:
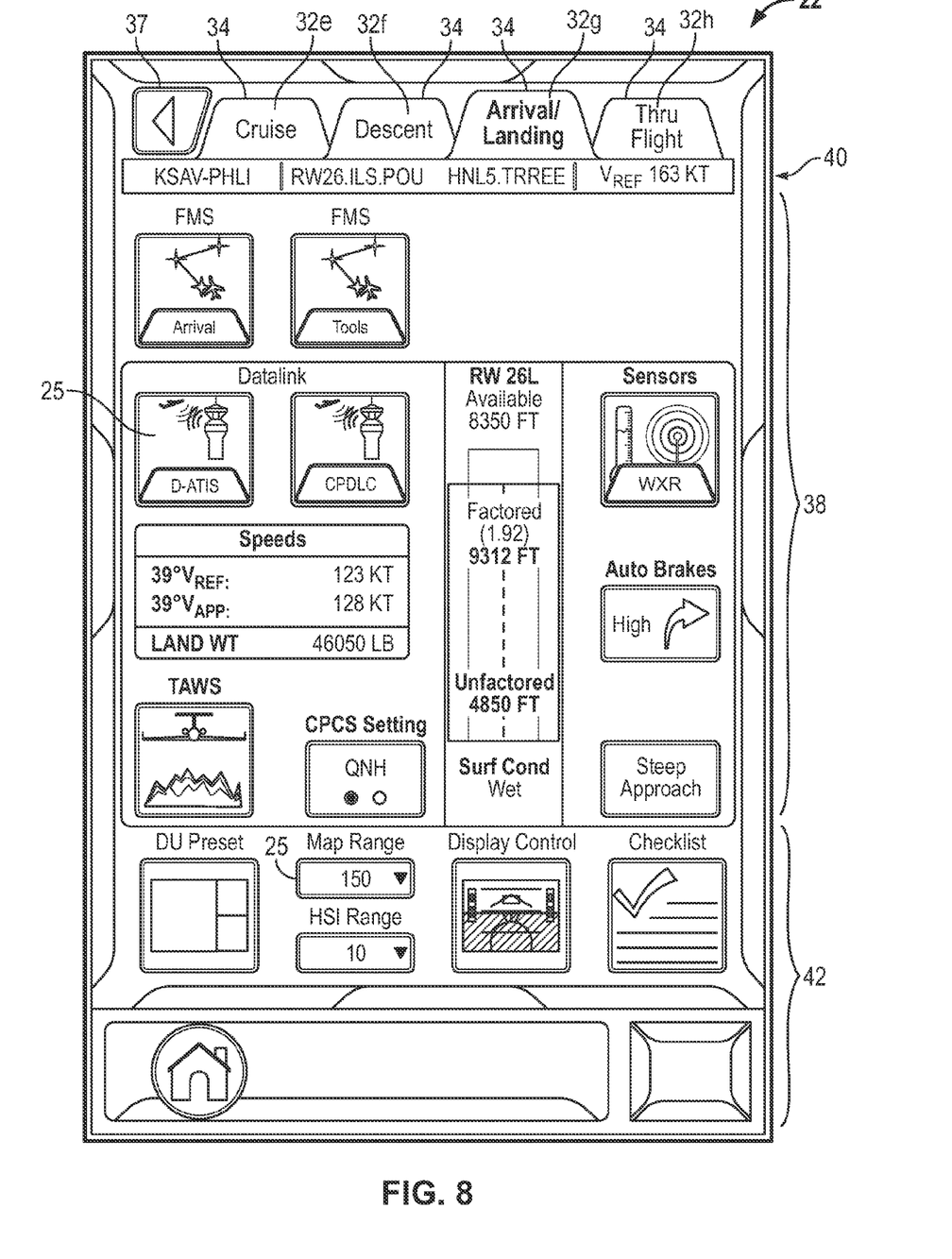
FIG. 8 is a display image associated with an arrival and landing phase of flight of an aircraft according to one embodiment.
Figure 9:
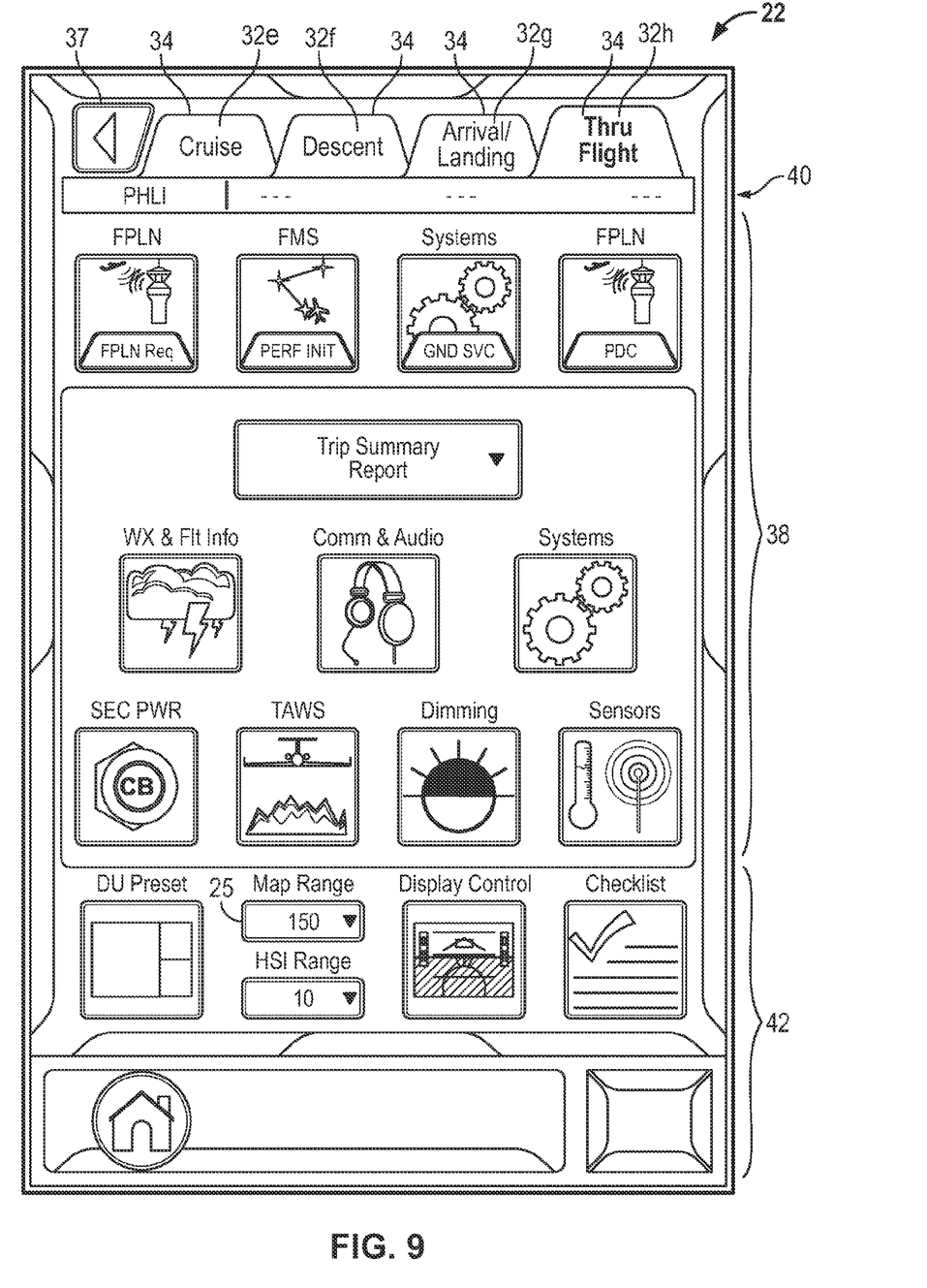
FIG. 9 is a display image associated with a thru flight phase of flight of an aircraft according to one embodiment.
Figure 10:
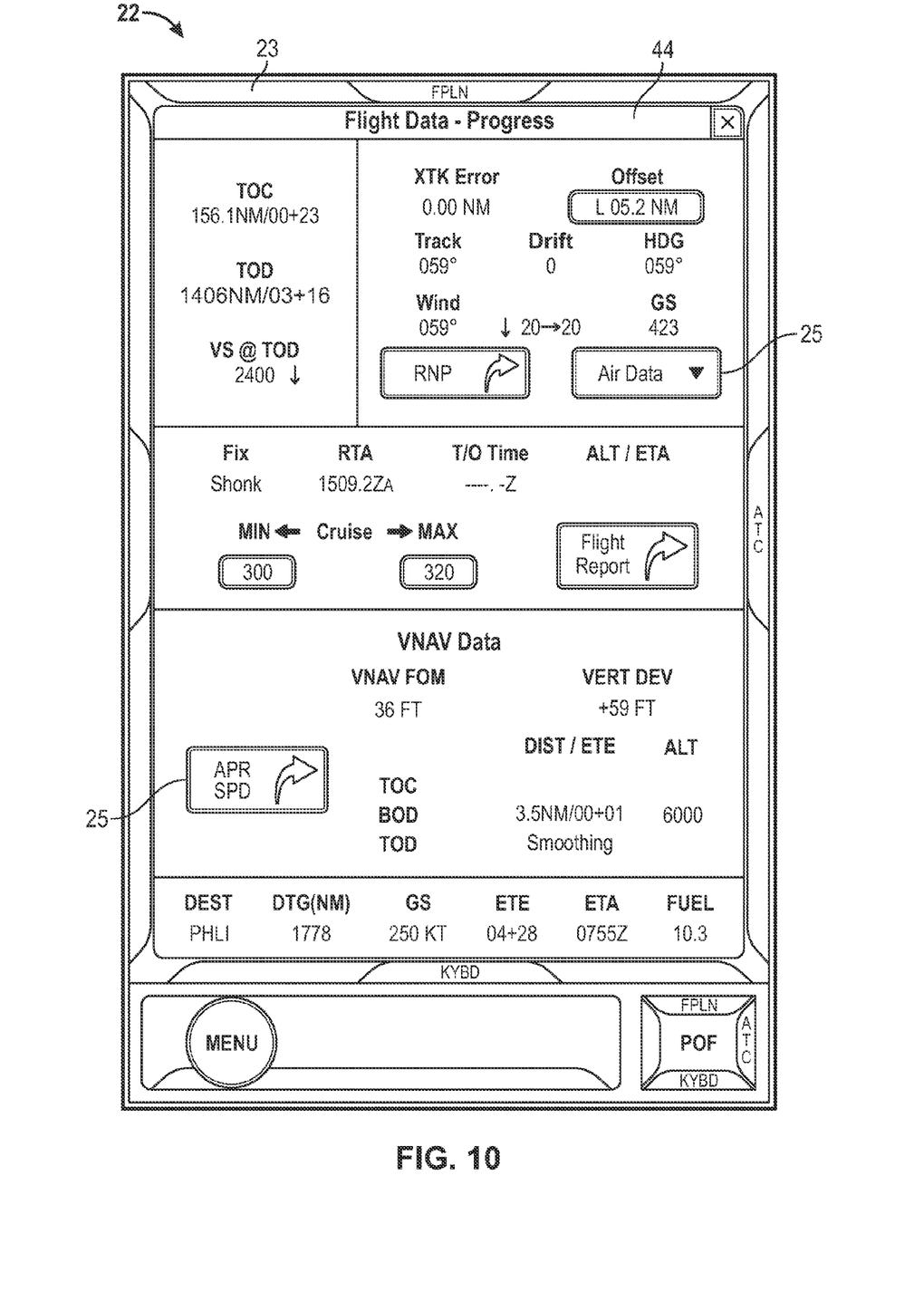
FIG. 10 is a display image showing a pop-up window providing data on progress of a flight of an aircraft.

The method includes the step of receiving a phase of flight of the aircraft. The selected phase of flight of the aircraft may be the current phase of flight of the aircraft. That is, the information and selectors presented on the second portion 38 of the display image 23 are related to the contemporaneous operation of the aircraft. For example, if the aircraft is taking off, the information and selectors 25 associated with the takeoff category are presented to the user, as shown in FIG. 5. However, other phases of flight, besides the current phase of flight, may alternatively be displayed.

In the illustrated embodiment, the user may manually select one of the phases of flight. Specifically, at least some of the categories 32 are displayed on each of the display images 23, as shown in FIGS. 3-9. More specifically, in the illustrated embodiment, the categories 32 representing the phases of flights are presented on tabs 34 disposed in a first portion 36 of the display image 23 such that each category 32 may be selected by the user. In the illustrated embodiment, the first portion 36 is located near a top (not numbered) of the display image 23. The user can select one the phases of flight by touching the tab 34 associated with the desired phase of flight. In the illustrated embodiment, an arrow button 37 is included in the first portion 36 to scroll to other tabs 34 that are not shown on a particular display image 23. Furthermore, in another embodiment, a continue button (not shown) may be implemented to quickly switch to the next phase of flight for the currently displayed phase of flight.

In an alternative embodiment (not shown), the step of receiving a phase of flight of the aircraft may be accomplished by an automatic process. For instance, the controller 26 may select the phase of flight of the aircraft based on input(s) from the at least one data source 28, the completion of a phase of flight, and/or other criteria. For example, the controller 26 may determine the current phase of flight based on a position of the aircraft, a speed of the aircraft, a rate of change of the speed of the aircraft (i.e., acceleration or deceleration), an elevation of the aircraft, a rate of change in elevation of the aircraft, and/or a flight plan of the aircraft. As such, the user would typically have the most relevant information and/or data available on the display 22, without having to manually select the desired phase of flight.

In response to receiving the phase of flight, the step of displaying information related to operation of the aircraft associated with the received phase of flight on the display 22 is performed. By displaying the information related to the received phase of flight, the user, e.g., the pilot, sees the information that is important regarding that particular phase of flight. As such, the user need not fumble with various hierarchical menus to find the important information for a particular phase of flight.

The method may also include the step of presenting selectors 25 related to operation of the aircraft associated with the received phase of flight on the display 22 in response to receiving the phase of flight. As such, the user may actuate at least one of the selectors 25 that is relevant to operation of the aircraft at the selected phase of flight. By actuating at least one of the selectors 25, the user provides an input to the system 20. Accordingly, the method may also include the step of receiving an input from a user from the selector 25 displayed on the display 22.

In the illustrated embodiment, the information and selectors 25 associated with the received phase of flight are presented on a second portion 38 of the display image 23, as shown in FIGS. 3-9. Specifically, the second portion 38 is situated below the first portion 36. Of course, the information and selectors 25 may be presented on different areas of the display image 23.

In the illustrated embodiment, all of the information and/or selectors 25 displayed on the second portion 38 of the displayed image are related to the selected category. That is, the second portion 38 does not present extraneous information, data, and/or selectors 25 that are unrelated to the selected phase of flight. As such, display 22 resources are conserved, allowing more compact displays 22 to be utilized. This is quite beneficial in aircraft cockpits, where panel space is often very limited. Furthermore, by limiting the information and/or selectors 25 in the second portion 38 to the selected category 32, the user is not distracted by extraneous information that is not pertinent to the selected phase of flight of the aircraft.

Furthermore, the user need not search and sift through various menus in order view the information and selectors 25 that are relevant to the selected phase of flight of the aircraft. Instead, the information and selectors 25 that are relevant to a certain phase of flight are displayed on one display image 23. Preferably, all of the information and selectors 25 that are relevant to a certain phase of flight are displayed on one display image 23.

The display image 23 of the illustrated embodiment also includes a third portion 40 for displaying a flight plan of the aircraft. In the illustrated embodiment, the third portion 40 is disposed between the first portion 36 and the second portion 38. However, flight plan information may be located at other locations on the display image 23.

The display image 23 of the illustrated embodiment further includes a fourth portion 42 for presenting selectors 25 to the user. Specifically, the selectors in the fourth portion 42 remain the same regardless of which phase of flight category 32 is selected and/or presented on the display 22.

The display 22 may also present a pop-up window 44 as part of the display image 23. The pop-up window 44 may be presented in response to the user selecting one of the selectors 25 on the display image 23. As an example, a pop-up window 44 showing flight data is shown in FIG. 11. Alternatively, the pop-up window 44 may present itself automatically, without selection by the user. The pop-up window 44 may further include one or more selectors 25 for receiving input from the user.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for presenting aircraft flight information, said method comprising:
   receiving a category at a controller, wherein the category is a phase of flight of an aircraft;
   determining a selector to be displayed based on relevance to operation of the aircraft at the phase of flight;
   displaying the selector configured to be selected by a user on a first portion of a display in response to receiving the category, wherein the selector is configured to control an aspect of the aircraft and is associated with the received phase of flight; and
   displaying other information related to operation of the aircraft on a second portion of the display regardless of the phase of flight category.

2. A method as set forth in claim 1, further comprising displaying a plurality of categories on the display such that each category may be selected by a user.

3. A method as set forth in claim 2, wherein receiving a selected category comprises receiving a selection of a particular category from the plurality of categories by a user.

4. A method as set forth in claim 1, further comprising receiving an input from a user from the selector displayed on the display.

5. A method as set forth in claim 1, wherein displaying a selector is further defined as displaying a plurality of selectors on the first portion of the display in response to receiving the category and
   further comprising changing at least one of the plurality of selectors displayed on the first portion of the display in response to receiving a different selected category.

6. A method as set forth in claim 1, further comprising displaying one or more of a takeoff category associated with takeoff of the aircraft, a climb category associated with a climb of the aircraft, a cruise category associated with a cruise stage of the aircraft, a descent category associated with a descent of the aircraft, and a landing category associated with landing of the aircraft.

7. A display system for presenting aircraft flight information, said system comprising:
   a controller configured to receive a category associated with a phase of flight of an aircraft and to determine a selector to be displayed based on relevance to operation of the aircraft at the phase of flight; and
   a display in communication with said controller and configured to display the selector on a first portion in response to receiving the category, the selector being configured to receive input from a user, associated with the received phase of flight category, and configured to control an aspect of the aircraft in response to receiving the input from the user;
   said display further configured to display other information related to operation of the aircraft on a second portion of the display regardless of the phase of flight category.

8. A system as set forth in claim 7, further comprising an input device in communication with said controller for receiving input from a user.

9. A system as set forth in claim 8, wherein said display is configured to display a plurality of categories on the display such that each category may be selected by the user utilizing the input device.

10. A method as set forth in claim 1, wherein displaying the other information comprises displaying a flight plan of the aircraft on the second portion of the display regardless of the category.

11. A method as set forth in claim 10, wherein displaying the flight plan of the aircraft further comprises displaying the flight plan of the aircraft on the second portion of the display regardless of the category, wherein the second portion is disposed in the same location on the display regardless of the category.

12. A method as set forth in claim 10, further comprising displaying a selector on a third portion of the display regardless of the category.

13. A method as set forth in claim 1 further comprising displaying a pop-up window in response to the user selecting the selector.

14. A method as set forth in claim 1 wherein displaying other information comprises displaying other information and/or selectors related to operation of the aircraft on a second portion of the display which remains the same regardless of any selection by the user.

* * * * *